Patented Apr. 5, 1932

1,852,721

UNITED STATES PATENT OFFICE

HAROLD A. MORTON, OF AKRON, OHIO

PROCESS FOR ACCELERATING RUBBER VULCANIZATION AND COMPOUND THEREFOR

No Drawing.  Application filed July 23, 1930. Serial No. 470,226.

My invention relates to the art of manufacturing vulcanized rubber compositions and in particular to a process including as a step the incorporation in a rubber compound the use of materials which may be termed as "bivalent metallic salts containing two different acidic radicals," for accelerating the vulcanization action and to a rubber compound or composition having such an accelerating substance incorporated therein.

Bivalent metallic salts containing two identical acidic radicals (e. g., zinc dimethyl dithio carbamate) have heretofore been known to the prior art but these materials in general have the disadvantage that they possess undesirable characteristics, such as low "critical temperature," that is, danger of prevulcanization, high cost, lack of flexibility, etc.

It is, accordingly, an object of this invention to provide a new class of materials which have the property of accelerating vulcanization and imparting to the rubber desirable characteristics.

Another object of this invention is to provide materials which are stable, less expensive, and in which the activity may be varied over a fairly wide range, by the proper choice of the raw materials. The activity and "temperature of cure" of the resulting accelerator is dependent to a large extent, on the particular raw materials employed.

For this reason, this class of materials is a very flexible one and the properties may be modified considerably to fit the specific purpose at hand.

There are a great number of materials which fall within the scope of this invention and in general they may be represented by the following simple representation:

$$R_1-M-R_2$$

where $R_1$ and $R_2$ are both acidic groups but in no case shall they be identical. $R_1$ shall in all cases be a dithio carbamic acid radical derived from a di alkyl amine, as for example:

Dimethyl dithio carbamic acid radical $$(CH_3)_2NCSS-$$

Diethyl dithio carbamic acid radical $$(C_2H_5)_2NCSS-$$

Dipropyl dithio carbamic acid radical $$(C_3H_7)_2NCSS-$$

Dibutyl dithio carbamic acid radical $$(C_4H_9)_2NCSS-$$

$R_2$ may be any other organic acid radical, preferably of the types hereinafter enumerated.

M may be any bivalent metal, preferably lead or zinc.

Type I

Where, in the formula $$R_1-M-R_2$$

$R_2$ is a dithio carbamic acid radical derived from a cyclic or heterocyclic amine.

The use of alkyl or aryl dithio carbamates of metals has been known to the prior art but in all cases $R_1$ and $R_2$ were identical. For example, metallic salts of dimethyl dithio carbamic acid were known but possessed undesirable characteristics such as tendency to cause prevulcanization, high cost, etc. The metallic salts of aryl dithio carbamates also showed undesirable properties, such as, slight activity, lack of stability and flexibility, etc., and produced rubber articles having inferior tensile strengths.

The present type offers a distinct improvement over the dithio carbamates known to the prior art due to the activity, stability, flexibility, low cost, etc., of the materials.

They also result in vulcanized articles having high tensile strength and elongation, durability and abrasion and flexing resistance.

The materials of Type I may be represented more specifically by the constitution:

$(R_a)_2NCSS-M-SSCNR_bR_c$ where:
M = bivalent metal
$R_a$ = alkyl hydrocarbon residues
$R_b$ = hydrogen, aryl or alkyl hydrocarbon residues
$R_c$ = aryl hydrocarbon residues Or as a special case $R_b$ and $R_c$ may both be replaced by a heterocylic ring residue as for example

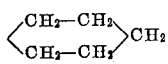

In other words, one nitrogen atom shall be attached to two alkyl hydrocarbon residues and the other nitrogen shall be attached to two aryl hydrocarbon residues or to one hydrogen atom and one aryl hydrocarbon residue or to one aryl and one alkyl hydrocarbon residue or to a piperidyl residue.

These compounds may be prepared by treating an equimolecular mixture of a secondary aliphatic amine and a cylic or heterocylic amine with carbon disulphide and caustic soda and then adding a solution of a soluble salt of the desired bivalent metal.

One of the preferred members of this type of compounds is lead phenyl dimethyl dithio carbamate, the chemical constitution probably being:

$(CH_3)_2NCSS-Pb-SSCNHC_6H_5$

This material may be readily prepared by treating one mol (81.5 grams) of dimethyl amine hydrochloride and one mol of aniline hydrochloride (129.5 grams) with four mols (160 grams) sodium hydroxide and two mols (152 grams) of carbon disulphide. After the above named ingredients have reacted completely, a solution of one mol (331 grams) of lead nitrate is added, whereupon the lead salt of phenyl dimethyl dithio carbamate acid is precipitated. This material may be filtered and dried by any of the known methods and after pulverizing is ready for use.

While it is thought the reaction takes place in the above manner, I do not wish to be bound by any of the theories here given but desire to be protected by Letters Patent on the materials as formed.

This type of metallic dithio carbamate includes the following:

Zinc phenyl dimethyl dithio carbamate $(CH_3)_2NCSS-Zn-SSCNHC_6H_5$

Zinc ortho tolyl diethyl dithio carbamate $(C_2H_5)_2NCSS-Zn-SSCNHC_6H_4CH_3-ortho$ Zinc para tolyl dimethyl dithio carbamate $(CH_3)_2NCSS-Zn-SSCNHC_6H_4CH_3-para$ Zinc ethyl phenyl dimethyl dithio carbamate $(CH_3)_2NCSS-Zn-SSCN(C_2H_5)C_6H_5$ Zinc xylyl dimethyl dithio carbamate $(CH_3)_2NCSS-Zn-SSCNHC_6H_3(CH_3)_2$ Zinc piperidyl dimethyl dithio carbamate $(CH_3)_2NCSS-Zn-SSCNC_5H_{10}$ Zinc alpha naphthyl dimethyl dithio carbamate $(CH_3)_2NCSS-Zn-SSCNHC_{10}H_7-alpha$ Zinc beta naphthyl dimethyl dithio carbamate $(CH_3)_2NCSS-Zn-SSCNHC_{10}H_7-beta$ Lead diphenyl dimethyl dithio carbamate $(CH_3)_2NCSS-Pb-SSCN(C_6H_5)_2$ Lead ethyl phenyl dimethyl dithio carbamate $(CH_3)_2NCSS-Pb-SSCN(C_2H_5)C_6H_5$ Lead xylyl dimethyl dithio carbamate $(CH_3)_2NCSS-Pb-SSCNHC_6H_3(CH_3)_2$ Lead para tolyl dimethyl dithio carbamate $(CH_3)_2NCSS-Pb-SSCNHC_6H_4CH_3-para$ Lead piperidyl dibutyl dithio carbamate $(C_4H_9)_2NCSS-Pb-SSCNC_5H_{10}$ Lead beta naphthyl dimethyl dithio carbamate $(CH_3)_2NCSS-Pb-SSCNHC_{10}H_7-beta$ This type of metallic dithio carbamate is superior to the metallic dithio carbamates known to the prior art. The activity and properties may be varied considerably by the proper choice of the two components.

The vulcanized product exhibits high tensile strengths, elongation and in general the characteristics are superior to the simple metallic dithio carbamates.

The invention may be practiced by the utilization of lead phenyl dimethyl dithio carbamate, the quantity of course being dependent upon the rubber compound in question. It will be found that a satisfactory product may be obtained by employing from 0.25% to 3.0% based on 100 parts of rubber. The quantity to be employed for any particular compound or rate of cure, can be easily determined by one skilled in the art.

This type of accelerating materials can be employed for vulcanization at various temperatures, although the preferred method of curing is at temperatures corresponding to 15-30 pounds steam pressure (250° F.–274° F.)

These materials, in general, function to their maximum extent when zinc oxide is present as an activator.

As examples of carrying out the invention by the use of materials of Type I, the following typical examples are given. It is not, however, restricted to such specific examples as many modifications may be made.

Example 1

The use of lead phenyl dimethyl dithio carbamate $(CH_3)_2NCSS-Pb-SSCNHC_6H_5$ in a rubber compound is illustrated by this example. The recipe of the rubber compound is as follows:

| | |
|---|---|
| Smoked sheets | 55.3125 |
| Stearic acid | 2.0 |
| Sulphur | 2.25 |
| Carbon black | 20.0 |
| Zinc oxide | 16.2875 |
| Pine tar oil | 3.5 |
| Lead phenyl dimethyl dithio carbamate | 0.65 |
| | 100.0 |

The above stock was compounded, mixed and press cured over a range of cures and the tensile strength measured:

| Cure | Tensile | Elongation |
|---|---|---|
| 20'x20# | 2750 | 830% |
| 30'x20# | 3730 | 830% |
| 40'x20# | 4075 | 800% |
| 50'x20# | 4095 | 790% |
| 60'x20# | 4130 | 750% |
| 70'x20# | 4050 | 730% |
| 80'x20# | 4015 | 710% |

Example 2

This example serves to illustrate the use of several different metallic salts of this type. The recipe is as follows:

| | |
|---|---|
| Rubber | 100 |
| Zinc oxide | 10 |
| Sulphur | 4 |
| Accelerator | 1 |

In the following table of results, the accelerators are as follows:

Stock A=1% lead para tolyl dimethyl dithio carbamate $(CH_3)_2NCSS-Pb-SSCNHC_6H_4CH_3-para$ Stock B=1% lead xylyl dimethyl dithio carbamate $(CH_3)_2NCSS-Pb-SSCNHC_6H_3(CH_3)_2$ Stock C=1% zinc beta naphthyl dimethyl dithio carbamate $(CH_3)_2NCSS-Zn-SSCNHC_{10}H_7-beta$ The stocks were mixed and cured and the tensile strength determined, using a sheet of stock 1/16th inch in thickness.

| Cure | Stock A Tensile | Stock A Elong. | Stock B Tensile | Stock B Elong. | Stock C Tensile | Stock C Elong. |
|---|---|---|---|---|---|---|
| 5' x 20# | | | | | 3680 | 790% |
| 10' x 20# | | | | | 4035 | 760% |
| 15' x 20# | 1785 | 870% | 1470 | 990% | 3935 | 770% |
| 20' x 20# | | | | | 4010 | 720% |
| 30' x 20# | 2690 | 840% | 2640 | 920% | | |
| 50' x 20# | 3160 | 790% | 3120 | 880% | | |
| 70' x 20# | 3585 | 790% | 3385 | 870% | | |
| 90' x 20# | 3750 | 760% | 3370 | 850% | | |

Example 3

Illustrating the use of zinc phenyl dimethyl dithio carbamate $[(CH_3)_2NCSS-Zn-SSCNHC_6H_5]$ in a pure gum stock of the following composition:

| | |
|---|---|
| Rubber | 100 |
| Zinc oxide | 10 |
| Sulphur | 2 |
| Zinc phenyl dimethyl dithio carbamate | 1 |

Tensile strength measurements over a range of cures showed the following results:

| Cure | Tensile | Elongation |
|---|---|---|
| 1'x40# | 3290 | 880% |
| 2'x40# | 3850 | 870% |
| 3'x40# | 4375 | 850% |
| 5'x40# | 3610 | 780% |
| 5'x20# | 3650 | 800% |
| 10'x20# | 4275 | 770% |
| 15'x20# | 4070 | 710% |

Type II

Where, in the formula $$R_1-M-R_2$$

$R_2$ is a dithio carbamic acid radical derived from a straight chain aliphatic amine substituted by one or more cyclic groups, or an aliphatic diamine whether substituted or unsubstituted.

One of the preferred members of this type is lead (beta anilino ethyl) phenyl dimethyl dithio carbamate, the chemical constitution probably being:

$(CH_3)_2NCSS-Pb-SSCN(C_6H_5)CH_2CH_2NHC_6H_5$

This material may be readily prepared by treating one mol of dimethyl amine hydrochloride and one mol of 1-2 di (phenyl amino) ethane hydrochloride with four mols of sodium hydroxide and two mols of carbon disulphide.

The reaction is carried out at 15° centigrade or below and vigorous agitation is maintained. After these ingredients have reacted completely, one mol of a soluble lead salt, such as lead nitrate, is added whereupon the lead salt is precipitated. After filtering, drying and pulverizing, the material is ready for use.

Other members of this group (Type II) which may be mentioned are:

Lead [(B ortho toluidino ethyl) o-tolyl] dimethyl dithio carbamate $(CH_3)_2NCSS-Pb-SSCN(C_6H_4CH_3)CH_2CH_2NHC_6H_4CH_3$ Lead [(B para poluidino ethyl) p-tolyl] dimethyl dithio carbamate $(CH_3)_2NCSS-Pb-SSCN(C_6H_4CH_3)CH_2CH_2NHC_6H_4CH_3$ Lead [(B xylidino ethyl) xylyl] dimethyl dithio carbamate $(CH_3)_2NCSS-Pb-SSCNC_6H_3(CH_3)_2CH_2CH_2NHC_6H_3(CH_3)_2$ Zinc [(B xylidino ethyl) xylyl] diethyl dithio carbamate

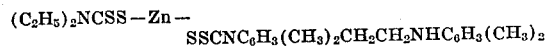

Zinc [(B para toluidino ethyl) p-tolyl] dimethyl dithio carbamate

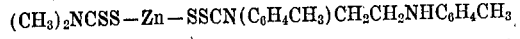

Lead [(B amino ethyl)] dimethyl dithio carbamate

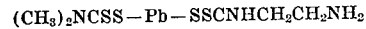

Zinc [(B anilino ethyl) phenyl] diethyl dithio carbamate

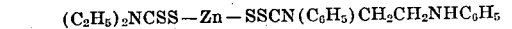

Lead [(B anilino ethyl) p-tolyl] dimethyl dithio carbamate

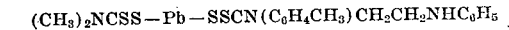

Lead [(B amino a-naphthyl) ethyl] a-naphthyl] dimethyl dithio carbamate

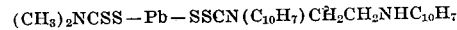

Zinc [B phenyl ethyl] dimethyl dithio carbamate

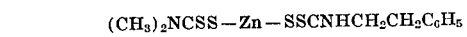

There are many other materials of this type which function in this manner and the above members simply serve to indicate the scope of the invention.

As examples of carrying out the invention by the use of materials of Type II the following are given.

Example 4

The use of accelerators of this type is illustrated in this example. The rubber stock has the following composition:

| | |
|---|---:|
| Rubber | 100 |
| Zinc oxide | 10 |
| Sulphur | 4 |
| Stearic acid | 1 |
| Accelerator | 1 |

In the following table of results, the stocks contain the following accelerators:

Stock A: Lead [(B para toluidino ethyl) p-tolyl] dimethyl dithio carbamate.

$(CH_3)_2NCSS-Pb-SSCN(C_6H_4CH_3)CH_2CH_2NHC_6H_4CH_3$

Stock B: Lead [(B anilino ethyl) p-tolyl] dimethyl dithio carbamate $(CH_3)_2NCSS-Pb-SSCN(C_6H_4CH_3)CH_2CH_2NHC_6H_5$ Stock C: Zinc [(B anilino ethyl) phenyl] dimethyl dithio carbamate $(CH_3)_2NCSS-Zn-SSCN(C_6H_5)CH_2CH_2NHC_6H_5$ Stock D: Lead [(B xylidino ethyl) xylyl] dimethyl dithio carbamate $(CH_3)_2NCSS-Pb-SSCNC_6H_3(CH_3)_2CH_2CH_2NHC_6H_3(CH_3)_2$ Stock E: Lead [(B anilino ethyl) phenyl] dimethyl dithio carbamate $(CH_3)_2NCSS-Pb-SSCN(C_6H_5)CH_2CH_2NHC_6H_5$ The above stocks were mixed and cured and the tensile strength determined. These are given, for a range of cures, in the following table.

| Cure | A | | B | | C | | D | | E | |
|---|---|---|---|---|---|---|---|---|---|---|
| | Tens. | Elong. | Tens. | Elong. | Tens. | Elong. | Tens. | Elong. | Tens. | Elong. |
| 1′ x20# | | | | | 3550 | 800% | | | | |
| 2′ x20# | | | | | 4355 | 800% | | | | |
| 3′ x20# | | | | | 4400 | 790% | | | | |
| 5′ x20# | 1945 | 970% | 50 | 870% | 4100 | 780% | 50 | 1040% | 1150 | 1020% |
| 10′ x20# | 3190 | 900% | | | 4000 | 760% | | | 3250 | 910% |
| 15′ x20# | 3450 | 840% | 2550 | 870% | | | 1215 | 820% | 3745 | 830% |
| 20′ x20# | 3715 | 780% | | | | | | | 3950 | 840% |
| 30′ x20# | 3830 | 770% | 3255 | 770% | | | 3150 | 810% | 3950 | 800% |
| 40′ x20# | | | | | | | | | 3890 | 810% |
| 50′ x20# | 3935 | 780% | 3370 | 770% | | | 3200 | 780% | 3975 | 800% |
| 60′ x20# | | | | | | | | | 3760 | 790% |
| 70′ x20# | 3510 | 750% | 3325 | 730% | | | 3890 | 770% | 3630 | 790% |
| 90′ x20# | | | 3635 | 750% | | | 3510 | 730% | | |
| 2′ x60# | | | 3220 | 800% | | | 2890 | 840% | | |
| 4′ x60# | | | 3970 | 770% | | | 3515 | 780% | | |
| 7′ x60# | | | 3445 | 740% | | | 3455 | 750% | | |
| 10′ x60# | | | 3525 | 760% | | | 3210 | 750% | | |

The above results demonstrate the wide range of curing characteristics exhibited by members of this type of materials.

Type III

Where, in the formula $$R_1-M-R_2$$

$R_2$ is a radical containing the carboxyl acid group.

The materials of Type III may be represented more specifically by the constitution

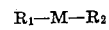

where
M = bivalent metal
$R_a$ = alkyl hydrocarbon residues
$R_b$ = hydrogen, alkyl or aryl hydrocarbon residues.

One of the preferred members of this group is the zinc salt formed from a mixture of one mol of dimethyl dithio carbamic acid and one mol of acetic acid. The chemical constitution of this zinc salt is thought probably to be:—

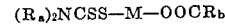

Other combinations which are members of this group are given in the folowing table.

| Metal | Dithio carbamic acid | Carboxylic acid | Probable formula |
|---|---|---|---|
| Zinc | Dimethyl | Stearic | $(CH_3)_2NCSS-Zn-OOC(CH_2)_{16}CH_3$ |
| Zinc | Dimethyl | Benzoic | $(CH_3)_2NCSS-Zn-OOCC_6H_5$ |
| Lead | Dimethyl | Stearic | $(CH_3)_2NCSS-Pb-OOC(CH_2)_{16}CH_3$ |
| Lead | Dimethyl | Abietic | $(CH_3)_2NCSS-Pb-OOCC_{19}H_{29}$ |
| Lead | Dimethyl | Oleic | $(CH_3)_2NCSS-Pb-OOCC_{17}H_{33}$ |
| Zinc | Dimethyl | Abietic | $(CH_3)_2NCSS-Zn-OOCC_{19}H_{29}$ |
| Lead | Dimethyl | Acetic | $(CH_3)_2NCSS-Pb-OOCCH_3$ |
| Lead | Dimethyl | Benzoic | $(CH_3)_2NCSS-Pb-OOCC_6H_5$ |
| Lead | Diethyl | Stearic | $(C_2H_5)NCSS-Pb-OOC(CH_2)_{16}CH_3$ |
| Zinc | Dibutyl | Benzoic | $(C_4H_9)_2NCSS-Zn-OOCC_6H_5$ |

There are many other materials of this type which function in this manner and the above examples serve only as an indication of the scope of the invention.

*Example 5*

The use of accelerators of Type III is illustrated in this example. The rubber stock as employed had the following composition:

| | |
|---|---|
| Rubber | 100 |
| Zinc oxide | 10 |
| Sulphur | 4 |
| Accelerator | 1 |

In the following table giving tensile strength values the accelerators employed are as follows:

Stock A: Zinc salt formed from one mol dimethyl dithio carbamic acid and one mol acetic acid.

Probable formula: $(CH_3)_2 NCSS-Zn-OOC.CH_3$

Stock B: Zinc salt formed from one mol dimethyl dithio carbamic acid and one mol benzoic acid.

Probable formula: $(CH_3)_2 NCSS-Zn-OOCC_6H_5$

Stock C: Lead salt formed from one mol dimethyl dithio carbamic acid and one mol acetic acid.

Probable formula: $(CH_3)_2 NCSS-Pb-OOC.CH_3$

Stock D: Zinc salt formed from one mol dimethyl dithio carbamic acid and one mol stearic acid.

Probable formula: $(CH_3)_2 NCSS-Zn-OOC(CH_2)_{16}.CH_3$

The above stocks were mixed and cured and the tensile strengths determined. These are given in the following table.

The tensile strengths are measured on a slab of rubber $\frac{1}{16}$th of an inch in thickness and cured in a press.

| Cure | Stock A Tensile | Stock A Elong. | Stock B Tensile | Stock B Elong. | Stock C Tensile | Stock C Elong. | Stock D Tensile | Stock D Elong. |
|---|---|---|---|---|---|---|---|---|
| 1' x 20# | 1800 | 910% | | | | | | |
| 3' x 20# | 2735 | 890% | | | | | | |
| 4' x 20# | | | 2860 | 930% | | | | |
| 5' x 20# | 3200 | 800% | 2980 | 810% | 150 | | | |
| 7' x 20# | | | 3510 | 820% | | | | |
| 8' x 20# | 3730 | 760% | | | | | | |
| 10' x 20# | 3930 | 740% | 3525 | 770% | 350 | | 2290 | 960% |
| 15' x 20# | 4235 | 730% | 3570 | 750% | 1160 | 820% | 2390 | 900% |
| 20' x 20# | 4115 | 700% | 3730 | 750% | 2140 | 900% | 3480 | 930% |
| 25' x 20# | 4050 | 710% | 3590 | 730% | | | | |
| 30' x 20# | 3940 | 700% | 3380 | 720% | 2450 | 860% | 3450 | 900% |
| 40' x 20# | | | | | | | 3365 | 870% |
| 50' x 20# | | | | | 2990 | 830% | 3170 | 850% |
| 70' x 20# | | | | | 3365 | 780% | | |
| 90' x 20# | | | | | 3585 | 750% | | |
| 120' x 20# | | | | | 3340 | 740% | | |
| 2' x 40# | | | 2590 | 860% | | | | |
| 3' x 40# | | | 3170 | 830% | | | | |
| 5' x 40# | | | 3185 | 800% | | | | |
| 7' x 40# | | | 3270 | 740% | | | | |
| 10' x 40# | | | 3030 | 740% | | | | |

*Type IV*

Where, in the formula $$R_1-M-R_2$$

$R_2$ is a radical containing the mercapto ($-SH$) group.

The materials of Type IV may be represented more specifically by the constitution $$(Ra)_2NCSS-M-S-Rb$$

where,

M = bivalent metal
Ra = alkyl hydrocarbon residue
Rb = alkyl, cyclic or heterocyclic hydrocarbon residues.

One of the preferred members of this group is the lead salt prepared from a molecular mixture of dimethyl dithio carbamic acid and mercaptobenzothiazole. This lead salt probably has the chemical constitution:

This material may be readily prepared by precipitating a molecular mixture of the sodium salts of dimethyl dithio carbamic acid and mercaptobenzothiazole with a soluble lead salt such as lead nitrate or lead acetate.

Other members of this group may be indicated as follows:

| Metal | Dithio carbamic acid | Mercapto acid | Probable formula |
|---|---|---|---|
| Zinc | Dimethyl | Mercaptobenzothiazole | 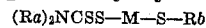 |
| Zinc | Dimethyl | 4-methyl 2-mercaptothiazole | 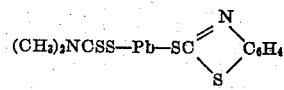 |
| Lead | Dimethyl | 4-methyl 2-mercaptothiazole | $(CH_3)_2NCSS-Pb-SC\begin{smallmatrix}S-CH\\ \\N-C-CH_3\end{smallmatrix}$ |

| Metal | Dithio carbamic acid | Mercapto acid | Probable formula |
|---|---|---|---|
| Lead | Diethyl | Mercaptobenzothiazole | $(C_2H_5)_2NCSS-Pb-SC\underset{S}{\overset{N}{\diagup\!\!\diagdown}}C_6H_4$ |
| Zinc | Dibutyl | Mercaptobenzothiazole | $(C_4H_9)_2NCSS-Zn-SC\underset{S}{\overset{N}{\diagup\!\!\diagdown}}C_6H_4$ |
| Zinc | Diethyl | Mercaptobenzothiazole | $(C_2H_5)_2NCSS-Zn-SC\underset{S}{\overset{N}{\diagup\!\!\diagdown}}C_6H_4$ |
| Lead | Dibutyl | Mercaptobenzothiazole | $(C_4H_9)_2NCSS-Pb-SC\underset{S}{\overset{N}{\diagup\!\!\diagdown}}C_6H_4$ |
| Lead | Dimethyl | Thiazoline 2-mercaptan | $(CH_3)_2NCSS-Pb-SC\underset{S-CH_2}{\overset{N-CH_2}{\diagup\!\!\diagdown}}$ |
| Zinc | Dimethyl | Ethyl mercaptan | $(CH_3)_2NCSS-Zn-SC_2H_5$ |
| Lead | Dimethyl | Phenyl mercaptan | $(CH_3)_2NCSS-Pb-SC_6H_5$ |

The above members serve to show the wide range of compounds of Type IV.

To illustrate the use of members of this type the following example is given.

Example 6

The rubber compound used in this example consists of:

Rubber _____ 100
Zinc oxide _____ 10
Sulphur _____ 4
Accelerator _____ 1

The accelerators used are:

Stock A: 1% lead salt from one mol dimethyl dithio carbamate and one mol mercaptobenzothiazole.

Probable formula: 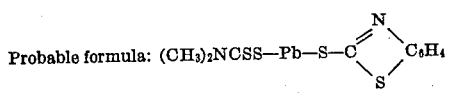

Stock B: 1% zinc salt from one mol dimethyl dithio carbamate and one mol mercaptobenzothiazole.

Probable formula: 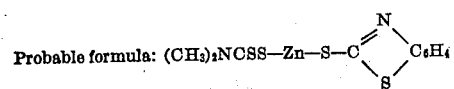

The above stocks were compounded and mixed and upon sheeting out were press-cured over a range of cures.

The tensile strength was measured, the results of which are given in the following table. The tensiles were measured on a 1/16th inch sheet.

| Cure | Stock A | | Stock B | |
|---|---|---|---|---|
| | Tensile | Elong. | Tensile | Elong. |
| 5' x 20# | | | 3315 | 780% |
| 8' x 20# | 1440 | 970% | 3640 | 730% |
| 10' x 20# | 2605 | 870% | 4165 | 750% |
| 15' x 20# | 3280 | 790% | 4285 | 750% |
| 20' x 20# | 3850 | 780% | 4325 | 750% |
| 30' x 20# | 4100 | 770% | | |
| 50' x 20# | 3830 | 770% | | |
| 1' x 40# | | | 3310 | 770% |
| 2' x 40# | | | 3730 | 760% |
| 3' x 40# | | | 3900 | 740% |
| 5' x 40# | 3850 | 850% | 3870 | 730% |
| 8' x 40# | 3870 | 820% | 3890 | 740% |
| 10' x 40# | 4155 | 820% | 3740 | 750% |
| 15' x 40# | 3860 | 810% | | |

Type V

Where, in the formula, $$R_1-M-R_2$$

$R_2$ is an alkylidene-bis dithio carbamic acid radical derived from a primary alkyl or aryl amine.

The materials of this type may be represented more fully by the following constitution:

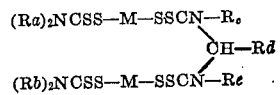

where,

M = bivalent metal
Ra, Rb = alkyl hydrocarbon residues
Rc, Re = alkyl or aryl hydrocarbon residues
Rd = hydrogen, alkly or aryl hydrocarbon residues.

One of the preferred members of this group may be termed "methylene bis lead phenyl dimethyl dithio carbamate" the chemical constitution probably being:

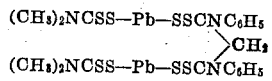

This material may be prepared by treating a mixture of 394 grams (one mol) of sodium methylene bis phenyl dithio carbamate and 246 grams (two mols) of sodium dimethyl dithio carbamate with 650 grams (two mols) of lead acetate. The precipitated lead salt is then filtered, dried and pulverized and is ready for use.

Other members of this group include the following:

Butylidene bis lead phenyl dimethyl dithio carbamate
Ethylidene bis zinc phenyl dimethyl dithio carbamate
Methylene bis zinc ortho tolyl dimethyl dithio carbamate
Ethylidene bis lead xylyl dimethyl dithio carbamate
Methylene bis lead para tolyl dimethyl dithio carbamate
Methylene bis zinc xylyl dimethyl dithio carbamate
Methylene bis zinc beta naphthyl dimethyl dithio carbamate
Ethylidene bis lead para tolyl dimethyl dithio carbamate
Butylidene bis zinc phenyl dimethyl dithio carbamate
Methylene bis lead xylyl dimethyl dithio carbamate The above examples serve to indicate the wide scope of this type of accelerators.

*Example 7*

To illustrate the use of materials of Type V a rubber stock was compounded containing 0.65 parts of methylene bis lead phenyl dimethyl dithio carbamate

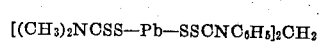

The other ingredients are as follows:

| | |
|---|---|
| Rubber | 55.3125 |
| Stearic acid | 2.0 |
| Sulphur | 2.25 |
| Carbon black | 20.0 |
| Zinc oxide | 16.2875 |
| Pine tar oil | 3.5 |
| | 99.35 |

The above stock was compounded, mixed and milled and upon curing, the tensile strengths were determined. The tensile strength was measured on slabs $\frac{1}{16}$th of an inch in thickness and press-cured.

| Cure | Tensile | Elong. | Tensile | Elong. |
|---|---|---|---|---|
| 5'x40# | 3820 | 780% | | |
| 10'x40# | 4175 | 740% | | |
| 15'x40# | 4050 | 680% | | |
| 20'x40# | 4045 | 680% | | |
| 25'x40# | 4000 | 640% | | |
| 30'x40# | 3945 | 460% | | |
| 20'x20# | | | 3890 | 740% |
| 30'x20# | | | 3960 | 730% |
| 40'x20# | | | 4210 | 710% |
| 50'x20# | | | 4150 | 700% |
| 60'x20# | | | 4010 | 670% |
| 70'x20# | | | 4050 | 650% |
| 80'x20# | | | 3945 | 640% |
| 90'x20# | | | 3905 | 630% |

What I claim is:

1. A rubber composition including a bivalent metallic salt containing two different acidic groups one of which is a dialkyl dithio carbamic acid group.

2. A rubber composition including a bivalent metallic salt made from two different acids, one of which is a dialkyl dithio carbamic acid.

3. A rubber composition including a bivalent metallic salt containing a dialkyl dithio carbamic acid group and a dithio carbamic acid group derived from a cyclic amine.

4. A rubber composition including a bivalent metallic salt made from a mixture of two dithio carbamic acids, one of which is derived from a dialkyl amine and the other from a cyclic amine.

5. A rubber composition including a bivalent metallic salt containing a dialkyl dithio carbamic acid group and a dithio carbamic acid group derived from a straight chain aliphatic amine substituted by one or more cyclic groups.

6. A rubber composition including a bivalent metallic salt containing a dialkyl dithio carbamic acid group and a dithio carbamic acid group derived from an aliphatic diamine.

7. A rubber composition including a bivalent metallic salt containing a dialkyl dithio carbamic acid group and a dithio carbamic acid group derived from an aliphatic diamine substituted by aryl hydrocarbon residues.

8. A rubber composition including a bivalent metallic salt containing a dialkyl dithio carbamic acid group and a dithio carbamic acid group derived from a 1-2 di (aryl amido) ethane.

9. A rubber composition including a bivalent metallic salt containing a dialkyl dithio carbamic acid group and a dithio carbamic acid group derived from a substituted 1-2 di (aryl amido) ethane.

10. A rubber composition including a bivalent metallic salt made from a mixture of two dithio carbamic acids one of which is derived from a dialkyl dimethyl amine and the other from a straight chain aliphatic amine substituted by one or more cyclic groups.

11. A rubber composition including a bivalent metallic salt made from a mixture of two dithio carbamic acids one of which is derived from dimethyl amine and the other from an aliphatic diamine.

12. A rubber composition including a bivalent metallic salt made from a mixture of two dithio carbamic acids one of which is derived from dimethyl amine and the other from an aliphatic diamine substituted by aryl hydrocarbon residues.

13. A rubber composition including a bivalent metallic salt made from a mixture of two dithio carbamic acids one of which is derived from dimethyl amine and the other from a 1–2 di (aryl amido) ethane.

14. A rubber composition including a bivalent metallic salt made from a mixture of two dithio carbamic acids one of which is derived from dimethyl amine and the other from a substituted 1–2 di (aryl amido) ethane.

15. A rubber composition including the lead salt made from a mixture of dimethyl dithio carbamic acid and N (beta anilino ethyl) phenyl dithio carbamic acid.

16. A rubber composition including the lead salt made from a mixture of dimethyl dithio carbamic acid and the dithio carbamic acid derived from 1–2 di (phenyl amino) ethane.

17. A rubber composition including lead [(beta anilino ethyl) phenyl] dimethyl dithio carbamate.

18. A rubber composition including a bivalent metallic salt wherein the metal has replaced the hydrogen atoms of two different organic compounds, one of which is a dialkyl dithio carbamic acid.

19. A rubber composition including a bivalent metallic salt wherein the metal has replaced the hydrogen atoms of the —SH groups of two different organic compounds, one of which is a dialkyl dithio carbamic acid.

20. A rubber composition including a bivalent metallic salt wherein the metal has replaced the hydrogen atoms of two different organic compounds, both of which are dithio carbamic acids.

21. A rubber composition including a bivalent metallic salt wherein the metal has replaced the hydrogen atoms of two different organic compounds, one of which is dimethyl dithio carbamic acid.

22. A rubber composition including a bivalent metallic salt wherein the metal has replaced the hydrogen atoms of the —SH groups of two different organic compounds, one of which is dimethyl dithio carbamic acid.

23. A process for accelerating the vulcanization of a rubber compound, which comprises incorporating in the compound a bivalent metallic salt containing two different acidic groups, one of which is a dialkyl dithio carbamic acid group.

In testimony whereof, I affix my signature.
HAROLD A. MORTON.